United States Patent
Friedrichsen et al.

(10) Patent No.: US 9,106,474 B2
(45) Date of Patent: Aug. 11, 2015

(54) LOSSLESS DATA STREAMING TO MULTIPLE CLIENTS

(71) Applicant: NATIONAL INSTRUMENTS CORPORATION, Austin, TX (US)

(72) Inventors: Joseph M. Friedrichsen, Austin, TX (US); Brett F. Phillips, Leander, TX (US); Johann G. Scholtz, Austin, TX (US)

(73) Assignee: National Instruments Corporation, Austin, TX (US)

(*) Notice: Subject to any disclaimer, the term of this patent is extended or adjusted under 35 U.S.C. 154(b) by 319 days.

(21) Appl. No.: 13/709,197

(22) Filed: Dec. 10, 2012

(65) Prior Publication Data

US 2013/0262695 A1 Oct. 3, 2013

Related U.S. Application Data

(60) Provisional application No. 61/617,003, filed on Mar. 28, 2012.

(51) Int. Cl.
*G06F 15/16* (2006.01)
*H04L 29/06* (2006.01)
*H04L 29/08* (2006.01)

(52) U.S. Cl.
CPC ...... *H04L 29/06027* (2013.01); *H04L 65/4084* (2013.01); *H04L 67/02* (2013.01)

(58) Field of Classification Search
CPC .................... H04L 29/06027; H04L 65/4084; H04L 67/02

USPC .................................................. 709/230, 231
See application file for complete search history.

(56) References Cited

U.S. PATENT DOCUMENTS

| | | | |
|---|---|---|---|
| 7,142,509 B1* | 11/2006 | Rovner et al. | 370/230 |
| 7,711,772 B2* | 5/2010 | Brown et al. | 709/203 |
| 2005/0102371 A1* | 5/2005 | Aksu | 709/217 |
| 2007/0061469 A1* | 3/2007 | Rhim et al. | 709/227 |
| 2008/0228898 A1* | 9/2008 | Shimizu | 709/218 |
| 2009/0106356 A1* | 4/2009 | Brase et al. | 709/203 |
| 2009/0287841 A1* | 11/2009 | Chapweske et al. | 709/231 |
| 2010/0094931 A1* | 4/2010 | Hosur et al. | 709/203 |
| 2011/0222787 A1* | 9/2011 | Thiemert et al. | 382/225 |
| 2012/0023254 A1* | 1/2012 | Park et al. | 709/231 |

(Continued)

OTHER PUBLICATIONS

Huang et al.; "A hybrid FEC-ARQ protocol for low-delay lossless sequential data streaming;" 2009 IEEE International Conference on Multimedia and Expo, Jun. 29, 2009, retrieved from <http://research.microsoft.com/apps/pubs/default.aspx?id=81365> on Jan. 9, 2013; pp. 1-8.

*Primary Examiner* — Mohamed Wasel
(74) *Attorney, Agent, or Firm* — Meyertons Hood Kivlin Kowert & Goetzel, P.C.; Jeffrey C. Hood; Mark S. Williams

(57) ABSTRACT

System and method for streaming data. A host device that includes a server may acquire data from a data source. The server may receive a request for data from at least one client device over a network via a lossless transmission protocol, wherein the request may specify a range of data to stream to the at least one client device. The server may stream the data over the network to the at least one client device via the lossless transmission protocol in accordance with the request. The at least one client device may receive and process the streamed data.

38 Claims, 8 Drawing Sheets

(56) References Cited

U.S. PATENT DOCUMENTS

| | | |
|---|---|---|
| 2012/0096180 A1 | 4/2012 | Ivanov et al. |
| 2013/0042262 A1* | 2/2013 | Riethmueller .................. 725/14 |
| 2013/0339529 A1* | 12/2013 | Rizzo et al. ................... 709/226 |
| 2014/0059627 A1* | 2/2014 | Gonder et al. .................. 725/93 |
| 2014/0143440 A1* | 5/2014 | Ramamurthy et al. ........ 709/231 |
| 2014/0198173 A1* | 7/2014 | Willig et al. ................ 348/14.03 |
| 2014/0359166 A1* | 12/2014 | Mamidwar et al. ........... 709/247 |

* cited by examiner

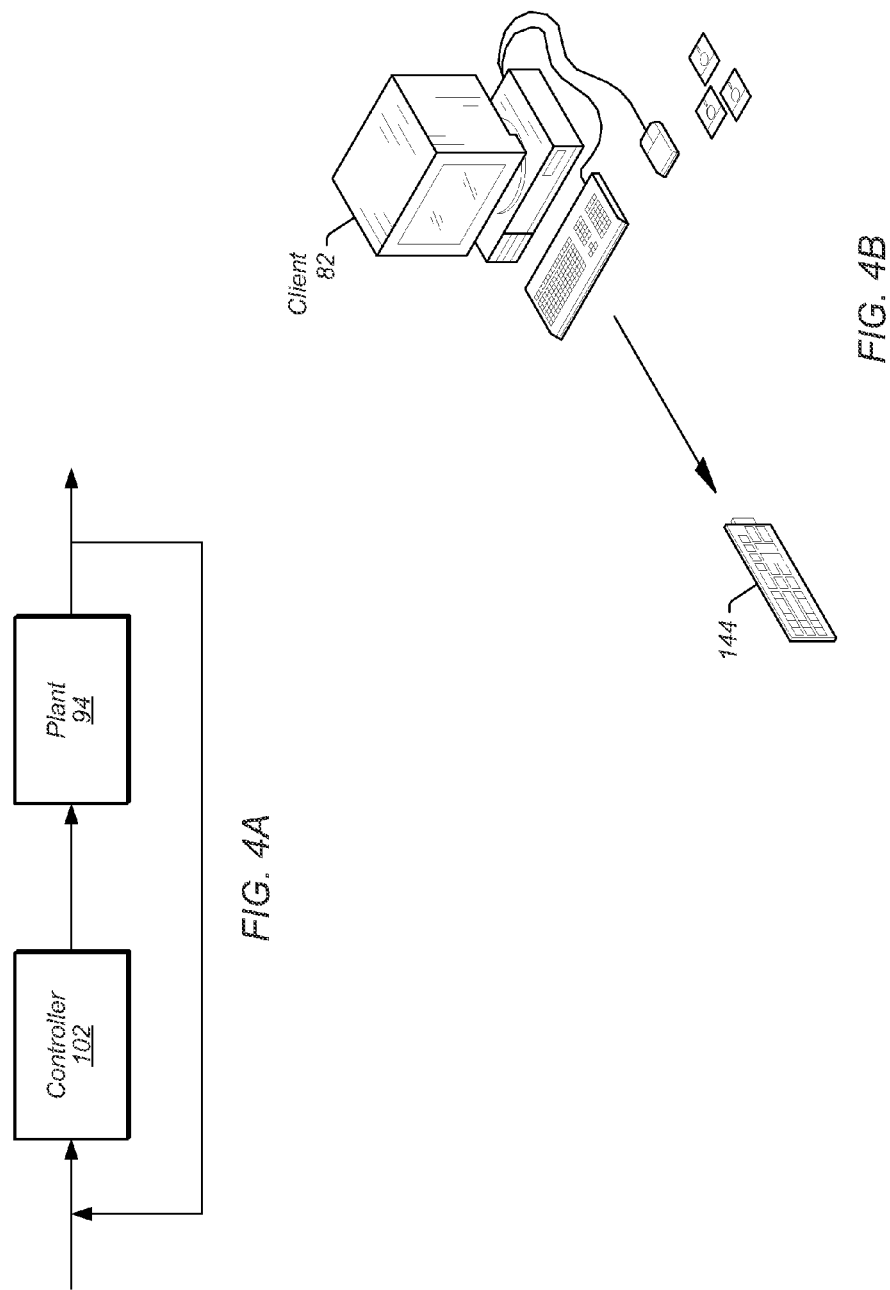

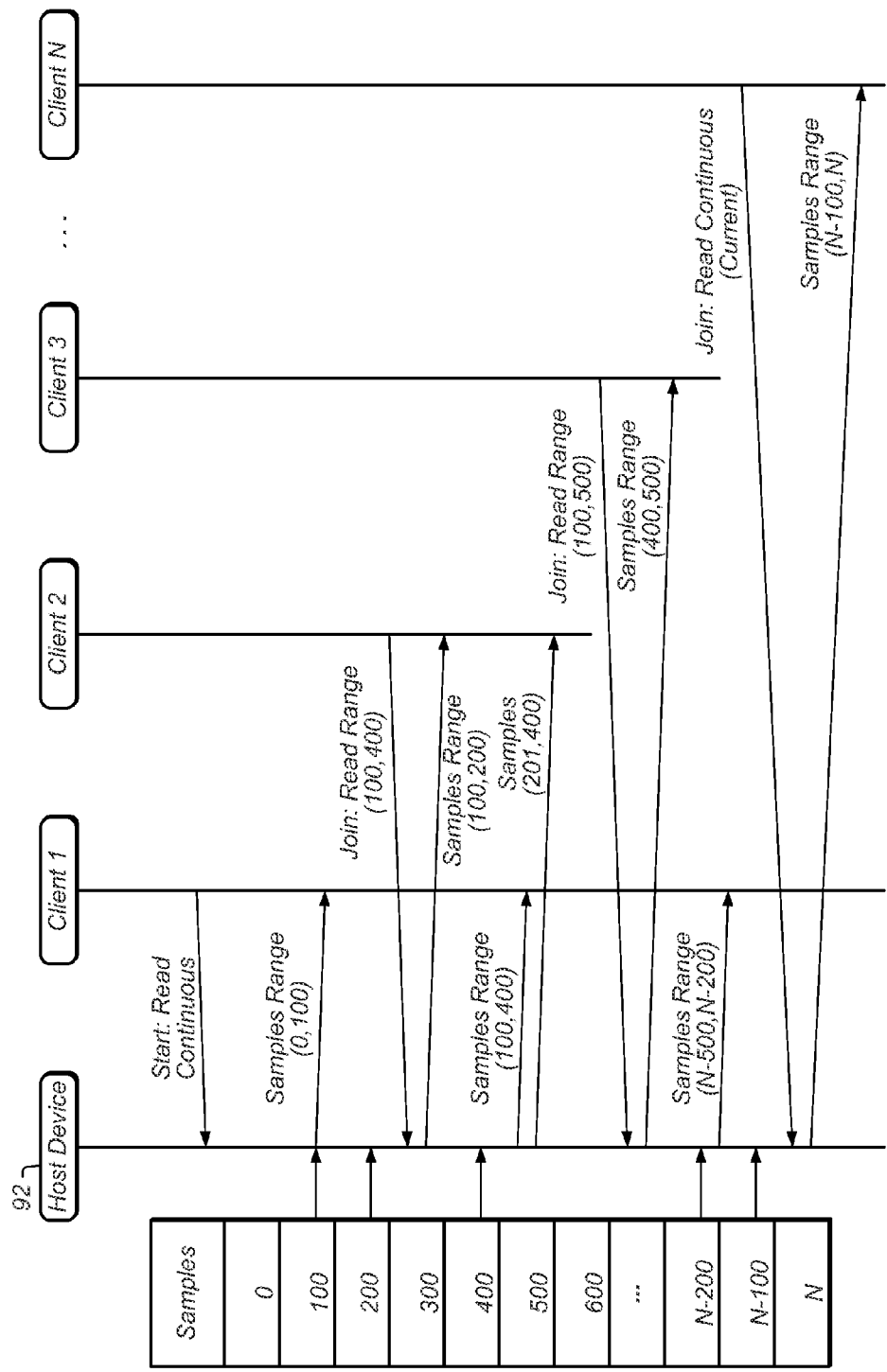

LOSSLESS DATA STREAMING TO MULTIPLE CLIENTS

This application claims benefit of priority to U.S. Provisional Application Ser. No. 61/617,003, titled "Lossless Data Streaming to Clients", filed Mar. 28, 2012, whose inventors are Joseph M. Friedrichsen, Brett F. Phillips, and Johann G. Scholtz, and which is hereby incorporated by reference in its entirety as though fully and completely set forth herein.

FIELD OF THE INVENTION

The present invention relates to the field of data transmission, and more particularly to a system and method for lossless streaming of data to multiple client devices via a lossless transmission protocol.

DESCRIPTION OF THE RELATED ART

With the advent of device communication networks has come a myriad of applications and related technologies for data streaming, e.g., for industrial, scientific, or medical test, measurement, automation, and control, entertainment, business and social media, and so forth. While many of these applications, such as entertainment audio or video streaming, do not require lossless transmission of the data, others, such as test, measurement, automation, and control may require that no data are lost during the transmission process.

One exemplary prior art application is remote or mobile data acquisition and display, which uses networked devices for streaming data acquisition and display. To this end, National Instruments Corporation (NI) supports a family of network devices, such as cDAQ-9188, cDAQ-9181, cDAQ-9191, WLS-9163, and ENET-9163, via NI's DAQmx driver software. All of these network devices rely on an internal protocol for communication to and from the device to control streaming acquisitions.

FIG. 1 illustrates an exemplary prior art system for mobile or remote data streaming and display, where, as may be seen, a transmitting device 10, e.g., a mobile data acquisition (DAQ) device, is communicatively coupled to a receiving device 12 over a network via wireless means. The transmitting device 10 acquires data and streams the acquired data to the receiving device 12, e.g., for display to a user. As shown, each of these devices uses an internal protocol (on TCP (Transmission Control Protocol)) to operate.

However, reliance on such internal protocols may present a number of problems. For example, the firmware for such devices may be difficult for customers to use in that interacting with the device requires internal protocols, which may be complex and thus difficult to use. Additionally, each new platform/environment typically requires a new implementation of the internal protocol to use on that platform. Moreover, the data acquisition stream returned from the device is returned as raw data, and so if the host device/application requires any type of engineering scaling (or other processing of the data), it must have knowledge regarding how to implement the scaling (or other processing). Finally, with current technologies, only a single user can receive data at a time.

Accordingly, improved systems and methods for data streaming are desired.

SUMMARY OF THE INVENTION

Various embodiments of a system and method for streaming data using a hypertext transmission protocol are presented below.

A host or server device may include or implement a server (e.g., via firmware), such as a web server that includes at least one web service (or multiple such services). The host device may also include one or more host device internals, where device internals refer to firmware (or other means, described herein) implementing functionality of the device besides the server related functionality, e.g., data acquisition, among other functions.

Similarly, at least one client device may include or implement a client (e.g., a web client), a client application, and client device internals. Note each device may communicate over the network via a lossless transmission protocol, such as HTTP, but internal communications between web-related components (e.g., web service, web client, or client application) and the device internals may utilize a second protocol, e.g., an internal protocol. Note, however, that in various other embodiments, the second protocol may be any protocol desired, e.g., any internal or proprietary protocol, or any public protocol, e.g., TCP, or even HTTP, as desired.

First, the host device may acquire data from a data source. In various embodiments, the data source may be or include a sensor, an instrument, a remote data store, local memory or storage, and so forth, as desired. The host device may be configured to communicate with the at least one client device over a network via a lossless transmission protocol, e.g., a hypertext transmission protocol (HTTP).

The server may stream the data over the network to the at least one client device via the lossless transmission protocol. In some embodiments, the server may stream the data to the at least one client device in response to a request for data sent by the (at least one) client device. The request may specify a range of data to stream to the at least one client device, and the server may stream the data over the network to the at least one client device via the lossless transmission protocol in accordance with the request. In other words, the server (or host device) may stream the specified range of data to the at least one client.

In some embodiments, the data received from the data source may be raw data. Accordingly, in some embodiments, the server, e.g., the at least one web service, may process the raw data, thereby generating processed data. Thus, the server (e.g., web service) streaming the data to the client device may include streaming the processed data to the at least one client device over the network via the lossless transmission protocol. The server (e.g., the at least one web service) may process the raw data in any of a number of ways. For example, the data may be scaled to specified engineering units, filtered, interpolated, etc., as desired, possibly in response to specification of such data processing included in the request from the at least one client device. Additionally, or alternatively, the request from the at least one client device may specify other aspects of the data to be streamed, e.g., the data source, the resolution (sample rate) of the data to be streamed, the format of the data, etc., as desired.

The at least one client device may receive the streamed data from the host device over the network via the lossless transmission protocol, and may process the streamed data, e.g., via the client, one or more client device internals, and/or a client application. Examples of such processing by the client device include, but are not limited to, monitoring the data for a specified condition, e.g., the client may monitor the data for a specific event to occur, e.g., temperature exceeds 110 degrees, and/or analyzing the data, e.g., to search for trends in the data, e.g., a large standard deviation in frequency or period of a sine wave, and so forth, as desired. Note that in various embodiments, any type of processing may be performed as desired. In some embodiments, the at least one client device may store and/or display the received data, e.g., on a display device, possibly after processing the data.

In some embodiments, a client application on the at least one client device may process the received streamed data, e.g., formatting the streamed data for display in a graphical user interface (GU), analyzing the streamed data, as discussed above, and so forth.

Note that since the server (host) and client devices communicate via the lossless transmission protocol, the client device (or devices) does not require knowledge or implementation of the server device's second (e.g., internal) protocol to operate, i.e., to communicate with the server device and receive streamed data therefrom. However, as noted above, the client (and the host) device may utilize such second protocols internally as desired.

In some embodiments, there may be multiple client devices communicating with the host or server device. Conversely, in some embodiments there may be multiple host or server devices from which a client may receive streamed data. In some embodiments, one or more of the devices may implement both server and client functionality, i.e., may implement both the web server and web client functionality. In other words, the devices may be peers, and may interact in a peer-to-peer fashion, where the particular application, instance, or interaction, may determine which role (server or client) is played by each device.

Each of the client devices may send respective requests for data from the server, and each respective request may specify a respective range of data to send to the corresponding client device. Thus, multiple client devices may communicate independently with a single host device, and further, may specify which of the acquired data to stream to the client device. Note that such specification by clients of their respective data streams (data to be streamed to the clients) facilitates both finite and continuous streaming of acquired data.

For example, the range of data may specify a start point in the data, and an end point in the data, or continuous streaming. More specifically, the range of data may specify one or more of: a range of historical data, a range of data from a historical start point up to a current time, a range of data from a historical start point to a future end point, a range of data from the current time to a future end point, or a range of data from a future start time to a future end time.

In some embodiments, the host device or server may begin data acquisition in response to a request from a client (device), and during subsequent streaming of data to this client device, one or more other client devices may request data from the host device/server and join the streaming process, and thus the server may stream data to a plurality of client devices in response to respective requests from the client devices. More specifically, the server may receive an initial request from a first client device of the plurality of client devices to initiate the acquisition of the data by the server and the streaming of the data, and then may receive a respective subsequent request from at least one second client device of the plurality of client devices requesting to receive the data from the server.

The host device or server may initiate the acquisition of the data in response to the initial request, stream the data to the first client device in response to the initial request, and in accordance with the specified respective range of data via the lossless transmission protocol. Subsequently, the server may stream at least a portion of the data to the at least one second client device in response to the respective subsequent request.

Similarly, on the client side, the client of the first client device may send an initial request to initiate acquisition of the data by the host device and streaming of the data, and may receive the streamed data from the host device in response to the initial request. Further, in one embodiment, a client of a client device (not the first client device) may send the request to the host device while the host device is already streaming data to at least one other client device, e.g., the first client device may receive subsequent streamed data from the host device in response to the request.

Thus, multiple clients may request and received streamed data from a server or host device over a network via a lossless transmission protocol.

BRIEF DESCRIPTION OF THE DRAWINGS

A better understanding of the present invention can be obtained when the following detailed description of the preferred embodiment is considered in conjunction with the following drawings, in which:

FIG. 4A is a high level block diagram of an exemplary system which may execute or utilize graphical programs;

FIG. 4B illustrates an exemplary system which may perform control and/or simulation functions utilizing graphical programs;

FIG. 7 illustrates data streaming to multiple client devices via a lossless transmission protocol, according to one embodiment.

Figure 1:
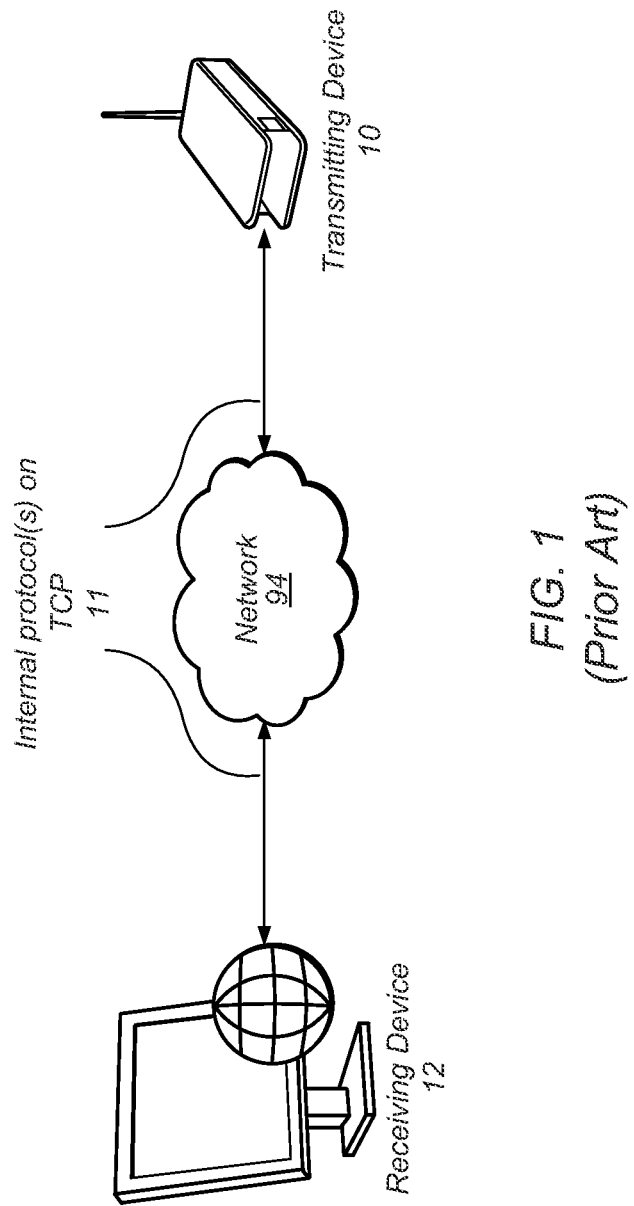
FIG. 1 illustrates a system for streaming data according to the prior art.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. Provisional application Ser. No. 13/527,208, titled "Lossless Data Streaming to Clients", filed Jun. 19, 2012.

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Pat. No. 7,210,117 titled "System and Method for Programmatically Generating a Graphical Program in Response to Program Information," filed Dec. 20, 2000.

TERMS

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Program—the term "program" is intended to have the full breadth of its ordinary meaning. The term "program" includes 1) a software program which may be stored in a memory and is executable by a processor or 2) a hardware configuration program useable for configuring a programmable hardware element.

Graphical Program—A program comprising a plurality of interconnected nodes or icons, wherein the plurality of interconnected nodes or icons visually indicate functionality of the program. The interconnected nodes or icons are graphical source code for the program. Graphical function nodes may also be referred to as blocks.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW®, DasyLab™, DiaDem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks (i.e., nodes) or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks or nodes are often referred to as the block diagram portion of the graphical program.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes, terminal nodes, structure nodes, etc. Nodes may be connected together in a graphical program by connection icons or wires.

Data Flow Program—A Software Program in which the program architecture is that of a directed graph specifying the flow of data through the program, and thus functions execute whenever the necessary input data are available. Data flow programs can be contrasted with procedural programs, which specify an execution flow of computations to be performed. As used herein "data flow" or "data flow programs" refer to "dynamically-scheduled data flow" and/or "statically-defined data flow".

Graphical Data Flow Program (or Graphical Data Flow Diagram)—A Graphical Program which is also a Data Flow Program. A Graphical Data Flow Program comprises a plurality of interconnected nodes (blocks), wherein at least a subset of the connections among the nodes visually indicate that data produced by one node is used by another node. A LabVIEW VI is one example of a graphical data flow program. A Simulink block diagram is another example of a graphical data flow program.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are configured to acquire and/or store data. A measurement device may also optionally be further configured to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

Automatically—refers to an action or operation performed by a computer system (e.g., software executed by the computer system) or device (e.g., circuitry, programmable hardware elements, ASICs (application specific integrated circuit), etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Internals—refers to existing software and/or hardware elements in the computer system utilized by or implementing embodiments of the invention, e.g., a wireless local area network (WLAN) adapter or TCP/HTTP software implementation. On a server, internals may also include required hardware and software to use any attached data acquisition device.

Figure 2:
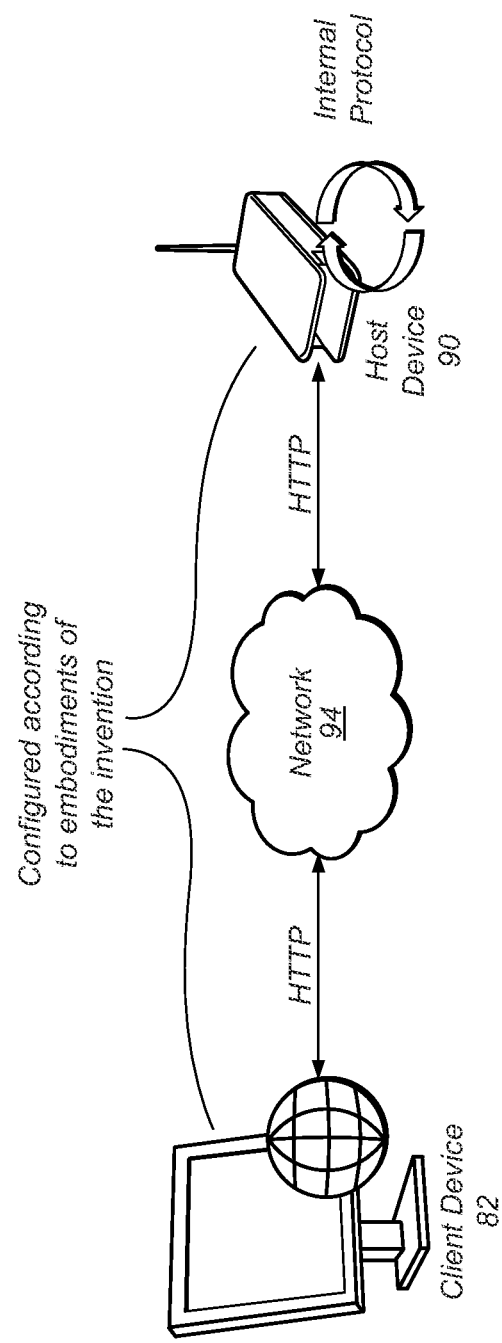
FIG. 2 illustrates a system comprising two or more networked devices implementing an embodiment of the present invention.

FIG. 2—Exemplary System for Data Streaming

FIG. 2 illustrates an exemplary system of networked devices for streaming data, according to one embodiment. As FIG. 2 shows, in this exemplary embodiment, a client device 82 is coupled to a host device or server 90 (which may also be referred to as a master device) over a network 94. The network 94 can be any of various types, including a LAN (local area network), WAN (wide area network), the Internet, or an Intranet, among others.

Note that in contrast with the prior art system of FIG. 1, in this system each of the devices may communicate with other devices solely via a lossless transmission protocol, e.g., HTTP. Note further that while the system shown only includes one client device, in other embodiments, multiple client devices may be used, as discussed in more detail below. Many of the embodiments described herein are directed to web-related implementations utilizing HTTP. However, these embodiments are intended to be exemplary only, and other embodiments are not so restricted. For example, in some embodiments the host device comprises a server, which may not be a web server and thus may not include a web service, and further, may not include a distinct service at all. In other words, the server and device internals may provide the functionality described. Similarly, while exemplary embodiments of the client are presented as web clients communicating with the server via HTTP, in some embodiments, the client is not a web client, and may not use HTTP at all.

As shown in FIG. 2, the client device 82 may include a display device configured to display data streamed from host (server) device 90, e.g., measurement data. The display device may also be configured to display a graphical user interface or front panel of a client application, e.g., for displaying the streamed data, and possibly for configuring the display or further processing the data. The graphical user interface may comprise any type of graphical user interface, e.g., depending on the platform.

The client device 82 and host device 90 may each include firmware implementing their respective functionalities, exemplary embodiments of which are described below with reference to FIG. 5. However, it should be noted that in other embodiments, the functionality described herein may be implemented via program instructions, e.g., one or more computer programs or software components, e.g., graphical programs, stored in a memory medium and executed by a processor, e.g., using a real time operating system (OS), or implemented via one or more programmable hardware elements, e.g., FPGAs, an ASIC (application specific integrated circuit), or any combination of these implementation approaches. Similarly, in various embodiments, the host device or the client device may be an embedded device, a workstation, a personal computer, a mobile or handheld computer, personal digital assistant (PDA), smart phone, tablet computer, etc., as desired.

Various embodiments further include receiving or storing instructions and/or data implemented in accordance with the foregoing description upon a carrier medium.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others.

However, it is noted that embodiments of the present invention can be used for a plethora of applications and is not limited to the above applications. In other words, applications discussed in the present description are exemplary only, and embodiments of the present invention may be used in any of various types of systems. Thus, embodiments of the system and method of the present invention is configured to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 3A:
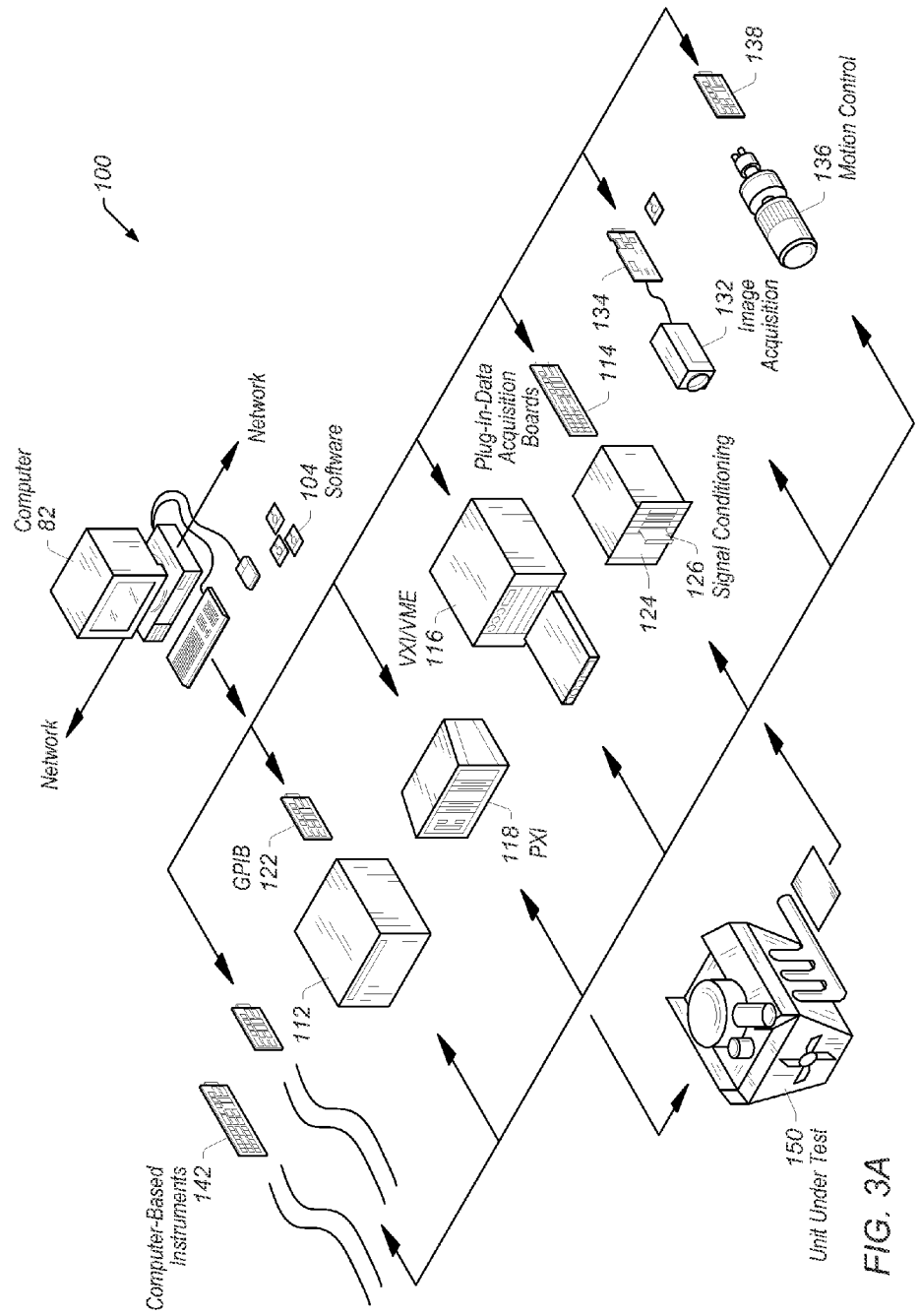
FIG. 3A illustrates an instrumentation control system according to one embodiment of the invention.

FIG. 3A illustrates an exemplary instrumentation control system 100 which may implement embodiments of the invention. The system 100 comprises a client device 82 which couples to one or more instruments. The exemplary client device 82 shown is a PC/workstation embodiment, and thus comprises a CPU, a display screen, memory, and one or more input devices such as a mouse or keyboard as shown. The client device 82 may operate with the one or more instruments to analyze, measure or control a unit under test (UUT) or process 150, where the one or more instruments include at least one host device 92 that streams data to the client device 82, where the host device may be included in or implemented by at least one of the instruments shown.

The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The client device may couple to and operate with one or more of these instruments. The instruments may be coupled to the unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 3B:
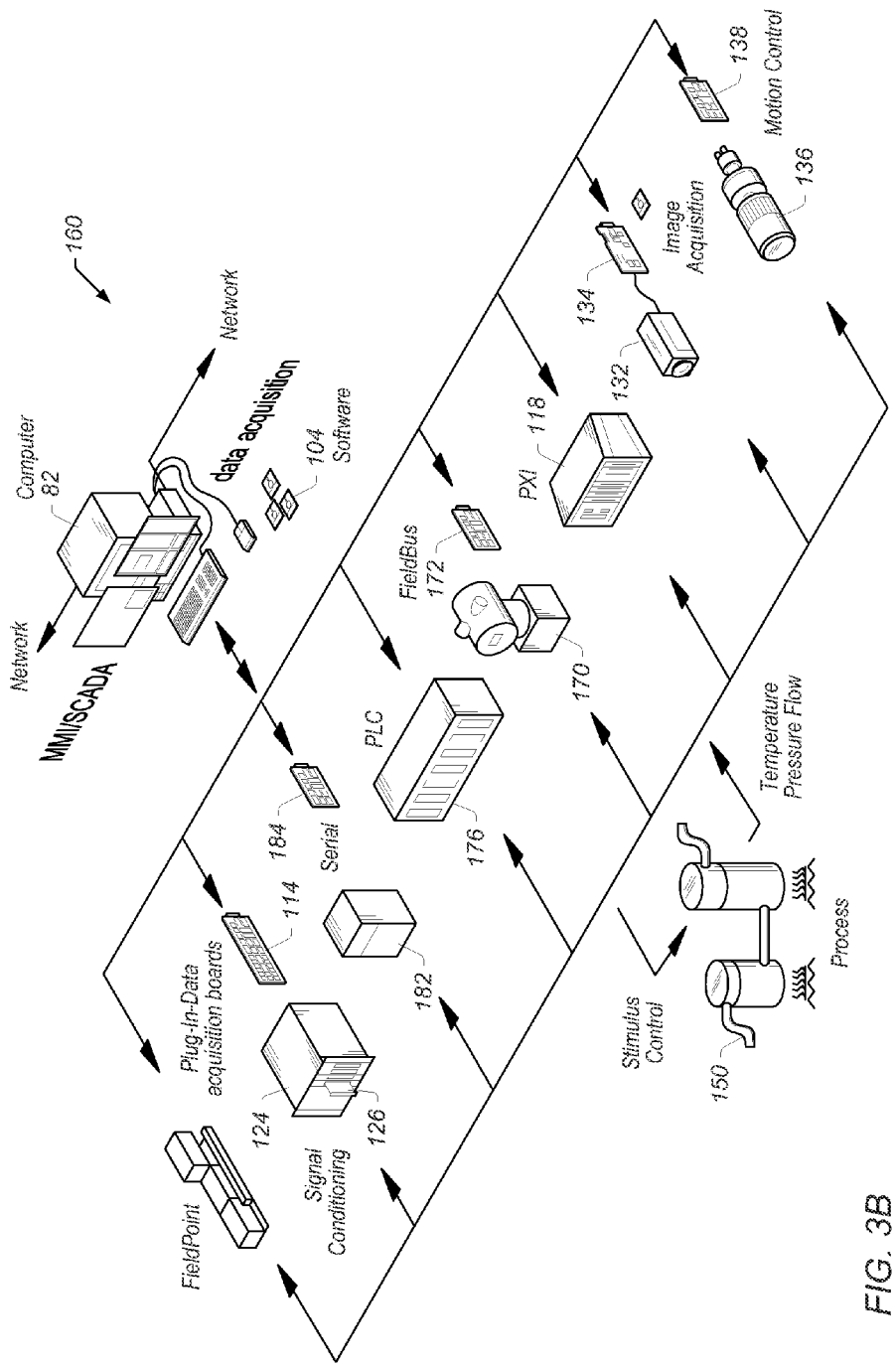
FIG. 3B illustrates an industrial automation system according to one embodiment of the invention.

FIG. 3B illustrates an exemplary industrial automation system 160 which may implement embodiments of the invention. The industrial automation system 160 is similar to the instrumentation or test and measurement system 100 shown in FIG. 3A. Elements which are similar or identical to elements in FIG. 3A have the same reference numerals for convenience. The system 160 may comprise a client device 82 which couples to one or more devices or instruments. The client device 82 shown is a PC/workstation embodiment that may comprise a CPU, a display screen, memory, and one or more input devices such as a mouse or keyboard as shown. The client device 82 may operate with the one or more devices to perform an automation function with respect to a process or device 150, such as MMI (Man Machine Interface), SCADA (Supervisory Control and Data Acquisition), portable or distributed data acquisition, process control, advanced analysis, or other control, among others. Similar to the system of FIG. 3A, the one or more devices may include at least one host device 92 that streams data to the client device 82, where the host device may be included in or implemented by at least one of the devices shown.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

FIG. 4A is a high level block diagram of an exemplary system which may implement or utilize embodiments of the present invention. FIG. 4A illustrates a general high-level block diagram of a generic control and/or simulation system which comprises a controller 102 and a plant 96. The controller 102 represents a control system. The plant 96 represents the system the user may be trying to control. For example, if the user is designing an ECU (electronic control unit) for a car, the controller 102 is the ECU and the plant 96 is the car's engine (and possibly other components such as transmission, brakes, and so on). The controller 102 may include or operate as client device 82, and the plant 96 may include or operate as host or serve device 90. For example, the plant 96 may stream data to the controller 102 in the manner disclosed herein.

FIG. 4B illustrates an exemplary system which may perform control and/or simulation functions. As shown, the controller may be implemented by a computer system 82 or other device (e.g., including a processor and memory medium, firmware, and/or a programmable hardware element) that executes or implements client device functionality as disclosed herein. In a similar manner, the plant 96 may be implemented by a computer system or other device 144 (e.g., including a processor and memory medium, firmware, and/or a programmable hardware element) that executes or implements host or server functionality as disclosed herein, or may be implemented in or as a real physical system, e.g., a car engine, or other process.

In one embodiment of the invention, the client and host devices may used in performing rapid control prototyping. Rapid Control Prototyping (RCP) generally refers to the process by which a user develops a control algorithm and quickly executes that algorithm on a target controller connected to a real system. The user may develop the control algorithm using a graphical program, and the graphical program may execute on the controller (client) 82, e.g., on a computer system or other device. The computer system may be a platform that supports real time execution, e.g., a device including a processor that executes a real time operating system (RTOS), or a device including a programmable hardware element.

In one embodiment of the invention, one or more graphical programs may be created which are used in performing Hardware in the Loop (HIL) simulation. Hardware in the Loop (HIL) refers to the execution of the plant or plant model 96 in real time to test operation of a real controller 82, which may be or include a client device as disclosed herein. For example, once the controller 82 has been designed, it may be expensive and complicated to actually test the controller 82 thoroughly in a real plant, e.g., a real car. Thus, the plant model (e.g., implemented by a graphical program) is executed in real time to make the real controller 82 "believe" or operate as if it is connected to a real plant, e.g., a real engine, e.g., host device 90.

In the embodiments of FIGS. 3A, 3B, and 4B above, one or more of the various devices may couple to each other over a network, such as the Internet. In one embodiment, the user operates to select a target device from a plurality of possible target devices for programming or configuration using a graphical program. Thus the user may create a graphical program on a computer and use (execute) the graphical program on that computer or deploy the graphical program to a target device (for remote execution on the target device) that is remotely located from the computer and coupled to the computer through a network.

Graphical software programs which perform data acquisition, analysis and/or presentation, e.g., for measurement, instrumentation control, industrial automation, modeling, or simulation, such as in the applications shown in FIGS. 3A and 3B, may be referred to as virtual instruments.

Figure 5:
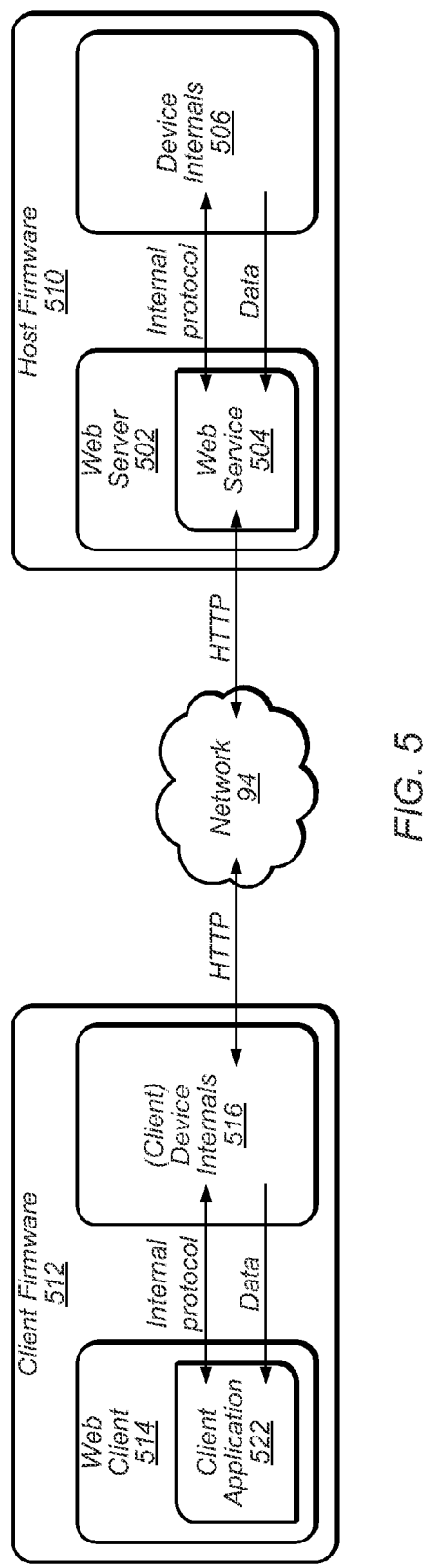
FIG. 5 is an exemplary block diagram of the system of FIG. 2, according to one embodiment.

FIG. 5—System Block Diagram

FIG. 5 is a block diagram representing one embodiment of the system illustrated in FIG. 2, or the systems shown in FIG. 3A, 3B, 4A, or 4B. It is noted that any type of system configuration or architecture can be used as desired, and FIG. 5 illustrates a representative embodiment implemented via respective firmware on the client and host devices.

In the embodiment shown, host device firmware 510 may include or implement a server 502. In the exemplary embodiment of FIG. 5, the server is a web server that includes at least one web service (or multiple such services) 504. The host device firmware may also include host device internals 506, where device internals refer to firmware implementing functionality of the device besides the server related functionality, such as data acquisition, among other non-server functions.

Similarly, as also shown, client device firmware 512 may include or implement a client 514, which in this exemplary embodiment is a web client. The client device firmware 512 may further include a client application 522, and/or client device internals. Note that while each device communicates over the network via a lossless transmission protocol, e.g., HTTP, internal communications between the device components (e.g., service 504, client 514, or client application 522) and the device internals 506 may utilize a second protocol, e.g., an internal protocol. Note, however, that in various other embodiments, the second protocol may be any protocol desired, e.g., any internal or proprietary protocol, or any public protocol, e.g., TCP, or even HTTP, as desired.

As indicated, in this exemplary embodiment, the host device internals 506 may send data to the server, which may then stream the data to the client device firmware 512. The host device may acquire the data (prior to sending, of course) from any of a variety of data sources, including a sensor, an instrument, a remote data store, local memory or storage, and so forth, as desired. In some embodiments, the data may be raw data, e.g., raw measurement data. Accordingly, in some embodiments, the server may process the raw data prior to transmitting to the client. For example, in one embodiment, the server or a service comprised in the server, such as a web service in a web server, may scale or format the data in accordance with some specified engineering units, e.g., degrees Celsius, newtons of force, etc., possibly in response to a request specifying the units from the client device. Note that such scaling/formatting is but one exemplary process, and that any other types of data processing may be performed by the server as desired, e.g., filtering, interpolating, etc.

Thus, in some embodiments, the server may stream the data via the lossless transmission protocol in scaled engineering units instead of raw data.

Information required to correctly implement such scaling (or other processing) may be stored on an EEPROM of the host device (or other memory implemented in the device).

Similarly, in the embodiment shown, the client device client (and/or client application, and/or client device internals, as discussed below) may receive the data streamed from the host device (via the lossless transmission protocol, as indicated), and may display (and/or store) the data, possibly after further processing/formatting the data, Note that since (in some embodiments) the host device processes the raw data, the client device(s) communicating with the host device no longer needs to understand how to scale from raw samples into engineering units (or otherwise process the raw data).

It should be noted that in some embodiments, there may be multiple client devices communicating with the host device, as will be discussed below.

Figure 6:
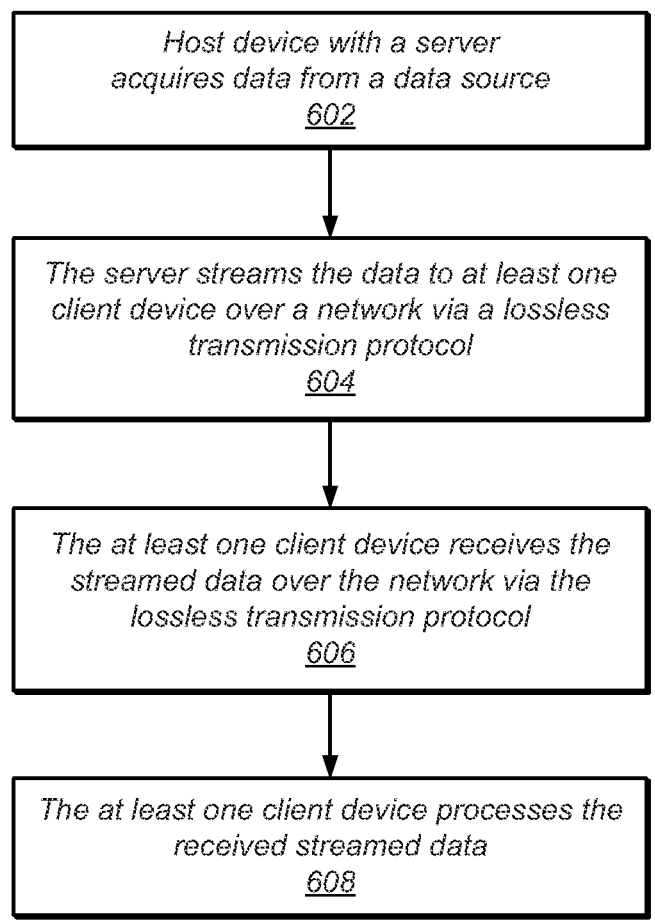
FIG. 6 is a flowchart diagram illustrating one embodiment of a method for streaming data via a lossless transmission protocol.

FIG. 6—Flowchart of a Method for Streaming Data

FIG. 6 illustrates a method for streaming data, according to one embodiment. The method shown in FIG. 6 may be used in conjunction with any of the devices shown in the above Figures, among other devices. In various embodiments, some of the method elements shown may be performed concurrently, in a different order than shown, or may be omitted. Additional method elements may also be performed as desired. As shown, this method may operate as follows.

First, in 602, a host (i.e., server) device may acquire data from a data source. The host device may include or implement a server, e.g., a web server with a least one web service, configured to communicate with at least one client device that includes a client (such as a web client) over a network via a lossless transmission protocol, e.g., a hypertext transmission protocol (HTTP). Further details regarding embodiments of the host device and the client device are provided above. As noted above, in various embodiments, the data source may be or include a sensor, an instrument, a remote data store, local memory or storage, and so forth, as desired.

In 604, the server may stream the data over the network to the at least one client device via the lossless transmission protocol. In some embodiments, the server may stream the data to the at least one client device in response to a request for data sent by the at least one client device. The request may specify a range of data to stream to the at least one client device, and the server may stream the data over the network to the at least one client device via the lossless transmission protocol in accordance with the request. In other words, the server (or host device) may stream the specified range of data to the at least one client.

As discussed above, in some embodiments, the data received from the data source may be raw data. Accordingly, in some embodiments, the server, e.g., the at least one web service, may process the raw data, thereby generating processed data. Thus, the server (e.g., web service) streaming the data to the client device may include streaming the processed data to the at least one client device over the network via the lossless transmission protocol. As also described above, the server (e.g., the at least one web service) may process the raw data in any of a number of ways. For example, the data may be scaled to specified engineering units, filtered, interpolated, etc., as desired, possibly in response to specification of such data processing included in the request from the at least one client device. Additionally, or alternatively, the request from the at least one client device may specify one or more other aspects of the data to be streamed, e.g., the data source, the resolution (sample rate) of the data to be streamed, the format of the data, etc., as desired.

In 606, the at least one client device may receive the streamed data from the host device over the network via the lossless transmission protocol.

In 608, the at least one client device may process the streamed data, e.g., via the client, one or more client device internals, and/or a client application. Examples of such processing by the at least one client device include, but are not limited to, monitoring the data for a specified condition, e.g., the client may monitor the data for a specific event to occur, e.g., temperature exceeds 110 degrees, and/or analyzing the data, e.g., to search for trends in the data, e.g., a large standard deviation in frequency or period of a sine wave, and so forth, as desired. Note that in various embodiments, any type of processing may be performed as desired. In some embodiments, the at least one client device may store and/or display the received data, e.g., on a display device, possibly after processing the data.

In some embodiments, a client application on the at least one client device may process the received streamed data, e.g., formatting the streamed data for display in a graphical user interface (GU), analyzing the streamed data, and so forth.

Note that since the server (host) and client devices communicate via the lossless transmission protocol, the client device (or devices) do not require knowledge or implementation of the server device's second (e.g., internal) protocol to operate, i.e., to communicate with the server device and receive streamed data therefrom. However, as noted above, the client (and the host) device may utilize such second protocols internally as desired.

Further Embodiments

Below are described various exemplary embodiments indicating the breadth of the embodiments contemplated. However, it should be noted that the embodiments described are intended to exemplary only, and are not intended to limit the invention to any particular form, function, or appearance. In further embodiments, any of the features and techniques disclosed herein may be used in any combinations desired.

As discussed above, in some embodiments, there may be multiple client devices communicating with the host or server device. Conversely, in some embodiments there may be multiple host or server devices from which a client may receive streamed data. In some embodiments, one or more of the devices may implement both server and client functionality, i.e., may implement both the web server and web client functionality. In other words, the devices may be peers, and may interact in a peer-to-peer fashion, where the particular application, instance, or interaction, may determine which role (server or client) is played by each device.

FIG. 7 illustrates communication between a server (i.e., host device) and multiple, e.g., N, client devices. In this particular exemplary embodiment, the server device allows multiple client devices to connect to a currently in progress data acquisition or "stream". In other words, the server device may be currently acquiring data, during which multiple client devices can connect to the server device and stream data therefrom, i.e., receive a data stream from the server device. In some embodiments, each client device may choose to receive samples that are acquired after joining the stream, previous values acquired in the stream, or a range of values in the stream. Thus, each client device may be able to specify the data to be streamed to that client device. Note that each of the clients may establish a session with the server, request data, and receive the requested data, independently of each other, and at different, but possibly overlapping, times. Thus, in some embodiments, data may be streamed to multiple client devices concurrently, where, as used herein, "concurrently" means that at least a portion of the concurrent processes overlap in time, i.e., at least some data are streamed to respective client devices in parallel.

For example, in some embodiments, the host device or server may begin data acquisition in response to a request from a client (device), and during subsequent streaming of data to this client device, one or more other client devices may request data from the host device/server and join the streaming process, and thus the server may stream data to a plurality of client devices in response to respective requests from the client devices. More specifically, the server may receive an initial request from a first client device of the plurality of client devices to initiate the acquisition of the data by the server and the streaming of the data, and then may receive a respective subsequent request from at least one second client device of the plurality of client devices requesting to receive the data from the server.

The host device or server may initiate the acquisition of the data in response to the initial request, stream the data to the first client device in response to the initial request, and in accordance with the specified respective range of data via the lossless transmission protocol. Subsequently, the server may stream at least a portion of the data to the at least one second client device in response to the respective subsequent request.

Similarly, on the client side, the client of the first client device may send an initial request to initiate acquisition of the data by the host device and streaming of the data, and may receive the streamed data from the host device in response to the initial request. Further, in one embodiment, a client of a client device (not the first client device) may send the request to the host device while the host device is already streaming data to at least one other client device, e.g., the first client device may receive subsequent streamed data from the host device in response to the request.

In the exemplary embodiment of FIG. 7, the server device acquires samples, as represented in the leftmost column. To the right of these sample designations are represented N client devices, ranging from Client 1 to Client N. Communications between the client devices and the host device are indicated by arrows.

As indicated in FIG. 7, and considered chronologically from the top of the Figure, Client 1 initiates or starts the acquisition via a request, specifically, a "Start: Read Continuous" command sent to the server device, and receives samples at unspecified intervals from the server device as the samples are acquired.

Client 2 joins a currently running acquisition, and requests a specific range of samples (100, 400) from the server device. However, note that not all samples in the specified range are available at the time of the request. Accordingly, the server device initially returns a partial range of available samples (100, 200), and returns the rest of the range (201, 400) when the samples are acquired.

Like Client 2, Client 3 joins a currently running acquisition, and requests a range of samples from the server device, this time (100, 500). In this embodiment, the server device returns only samples (400, 500) because samples 100 through 399 are no longer available.

Client N joins a currently running acquisition and requests to read continuously, beginning at the current value. The server then sends samples to Client N similarly to sending samples to Client 1, specifically, samples (N-100, N). As shown, Client 1, which is still receiving samples in continuous mode, receives samples (N-500, N-200) as they become available. Client 1 may disconnect at a future time, and Client N may optionally continue to receive data.

Thus, multiple client devices may communicate independently with a single host device, and further, may specify which of the acquired data to stream to the client device. Note that such specification by clients of their respective data streams (data to be streamed to the clients) facilitates both finite and continuous streaming of acquired data.

For example, the range of data may specify a start point in the data, and an end point in the data, or continuous streaming. More specifically, the range of data may specify one or more of: a range of historical data, a range of data from a historical start point up to a current time, a range of data from a historical start point to a future end point, a range of data from the current time to a future end point, or a range of data from a future start time to a future end time.

As noted above, the client device may include one or more client device internals. Accordingly, in one embodiment, the client device processing the streamed data may include the client device internals processing the streamed data. In some embodiments, the one or more client device internals may be implemented in firmware. In another embodiment, the client device may include a processor and memory, and the one or more client device internals may be implemented via software stored in the memory and executable by the processor. In further embodiments, the client device may include a programmable hardware element, and the one or more client device internals may be implemented via the programmable hardware element.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A system for streaming data in a lossless manner for test, measurement, automation, or control, the system comprising:
   a host device, comprising:
      a server; and
      one or more host device internals;
   configured to acquire data from a data source for test, measurement, automation, or control;
   wherein the server is configured to:
      communicate with one or more client devices over a network via a lossless transmission protocol;
      receive an initial request from a first client device of the one or more client devices to initiate the acquisition of the data by the server;
      initiate the acquisition of the data in response to the initial request;
      receive a request from at least one of the one or more client devices for data from the server, wherein the request specifies a range of data to stream to the at least one client device; and
      stream the data over the network to the at least one client device in a lossless manner for test, measurement, automation, or control via the lossless transmission protocol in accordance with the request.

2. The system of claim 1, wherein the one or more client devices comprise a plurality of client devices, wherein the server is configured to:

receive respective requests from each of the plurality of client devices, wherein each respective request specifies a respective range of data to stream to the client device; and stream the data to each of the plurality of clients in a lossless manner in response to the respective requests, and in accordance with the specified respective range of data via the lossless transmission protocol.

3. The system of claim 2, wherein the initial request from the first client device also requests initiation of the streaming of the data to the first client device and specifies a range of data to stream to the first client device;

wherein to receive respective requests from each of the plurality of client devices, the server is configured to:

receive a respective subsequent request from at least one second client device of the plurality of client devices requesting to receive the data from the server; and wherein to stream the data to each of the plurality of clients, the server is configured to:

stream the data to the first client device in response to the initial request, and in accordance with the specified respective range of data via the lossless transmission protocol; and stream at least a portion of the data to the at least one second client device in response to the respective subsequent request.

4. The system of claim 1, wherein the range of data specifies:

a start point in the data; and an end point in the data, or continuous streaming.

5. The system of claim 1, wherein the range of data specifies one or more of:

a range of historical data;

a range of data from a historical start point up to a current time;

a range of data from a historical start point to a future end point;

a range of data from the current time to a future end point; or a range of data from a future start time to a future end time.

6. The system of claim 1, wherein one or more of the server or the one or more host device internals are implemented in firmware.

7. The system of claim 1, wherein the host device comprises a processor and memory, and wherein one or more of the server or the one or more host device internals are implemented via software stored in the memory and executable by the processor.

8. The system of claim 1, wherein the host device comprises a programmable hardware element, and wherein one or more of the server or the one or more host device internals are implemented via the programmable hardware element.

9. The system of claim 1, wherein the server is further configured to process the data, thereby generating processed data, and wherein said streaming the data to the client device comprises streaming the processed data to the client device.

10. The system of claim 1, wherein the one or more host device internals are configured to communicate with the server via a second protocol.

11. The system of claim 10, wherein the second protocol comprises an internal protocol.

12. A system for streaming data in a lossless manner for test, measurement, automation, or control, the system comprising:

a client device, comprising:

a client, wherein the client is configured to:

communicate with a host device over a network via a lossless transmission protocol;

send an initial request to the host device over the network to initiate acquisition of data by the host device and streaming of the data, wherein the initial request specifies a range of data to stream to the client;

receive streamed data from the host device in a lossless manner for test, measurement, automation, or control via the lossless transmission protocol in accordance with the initial request; and process the streamed data.

13. The system of claim 12, wherein the client is further configured to:

send a request for data to the host device while the host device is already streaming data to at least one other client device, wherein the request for data specifies a respective range of data to stream to the client; and wherein to receive the streamed data, the client is configured to receive subsequent streamed data from the host device in response to the request.

14. The system of claim 12, wherein the client is implemented in firmware.

15. The system of claim 12, wherein the client device comprises a processor and memory, and wherein the client is implemented via software stored in the memory and executable by the processor.

16. The system of claim 12, wherein the client device comprises a programmable hardware element, and wherein the client is implemented via the programmable hardware element.

17. The system of claim 12, wherein the client device comprises one or more client device internals, and wherein to process the streamed data, the client device internals process the streamed data.

18. The system of claim 17, wherein the one or more client device internals are implemented in firmware.

19. The system of claim 17, wherein the client device comprises a processor and memory, and wherein the one or more client device internals are implemented via software stored in the memory and executable by the processor.

20. The system of claim 17, wherein the client device comprises a programmable hardware element, and wherein the one or more client device internals are implemented via the programmable hardware element.

21. The system of claim 17, wherein the client is configured to communicate with the one or more client device internals via a second protocol.

22. The system of claim 20, wherein the second protocol comprises an internal protocol.

23. The system of claim 12, wherein the range of data specifies:

a start point in the data; and an end point in the data, or continuous streaming.

24. The system of claim 12, wherein the range of data specifies one or more of:

a range of historical data;

a range of data from a historical start point up to a current time;

a range of data from a historical start point to a future end point;

a range of data from the current time to a future end point; or a range of data from a future start time to a future end time.

25. The system of claim 12, wherein the client device further comprises a client application, and wherein to process the streamed data, the client application is configured to process the streamed data.

26. A method for streaming data in a lossless manner for test, measurement, automation, or control, the method comprising:
- a host device acquiring data from a data source for test, measurement, automation, or control via one or more host device internals configured to acquire data, wherein the host device comprises a server;
- the server communicating with one or more client devices over a network via a lossless transmission medium;
- the server receiving an initial request from at least one of the one or more client devices to initiate acquisition of data by the host device and streaming of the data from the server for test, measurement, automation, or control, wherein the initial request specifies a range of data to stream to the at least one client device; and
- the server acquiring the data and streaming the data over the network to the at least one client device in a lossless manner for test, measurement, automation, or control via the lossless transmission protocol in response to the initial request.

27. The method of claim 26, further comprising:
- the server processing the data, thereby generating processed data, and wherein said streaming the data to the at least one client device comprises streaming the processed data to the client device.

28. The method of claim 26, wherein the one or more client devices comprise a plurality of client devices, the method further comprising:
- receiving respective requests from each of the plurality of client devices, wherein each respective request specifies a respective range of data to stream to the client device; and
- streaming the data to each of the plurality of clients in response to the respective requests, and in accordance with the specified respective range of data via the lossless transmission protocol.

29. The method of claim 26, wherein the range of data specifies:
- a start point in the data; and
- an end point in the data, or continuous streaming.

30. The method of claim 26, wherein the range of data specifies one or more of:
- a range of historical data;
- a range of data from a historical start point up to a current time;
- a range of data from a historical start point to a future end point;
- a range of data from the current time to a future end point; or
- a range of data from a future start time to a future end time.

31. The method of claim 26, wherein the host device further comprises one or more host device internals configured to communicate with the server via a second protocol.

32. The method of claim 31, wherein the second protocol comprises an internal protocol.

33. A method for streaming data in a lossless manner for test, measurement, automation, or control, the method comprising:
- a client on at least one client device sending an initial request for data to a host device over a network via a lossless transmission protocol to initiate acquisition of data by the host device and streaming of the data, wherein the request specifies a range of data to stream to the client;
- receiving streamed data from the host device over the network in a lossless manner for test, measurement, automation, or control via the lossless transmission protocol in accordance with the initial request; and
- the client processing the streamed data.

34. The method of claim 33, wherein the range of data specifies:
- a start point in the data; and
- an end point in the data, or continuous streaming.

35. The method of claim 33, wherein the range of data specifies one or more of:
- a range of historical data;
- a range of data from a historical start point up to a current time;
- a range of data from a historical start point to a future end point;
- a range of data from the current time to a future end point; or
- a range of data from a future start time to a future end time.

36. The method of claim 33, further comprising:
- a client application on the client device processing the received streamed data.

37. The method of claim 33, wherein said storing or displaying the streamed data is performed by one or more client device internals of the client device via a second protocol.

38. The method of claim 33, wherein the second protocol comprises an internal protocol.

* * * * *

UNITED STATES PATENT AND TRADEMARK OFFICE
CERTIFICATE OF CORRECTION

| | | |
|---|---|---|
| PATENT NO. | : 9,106,474 B2 | Page 1 of 1 |
| APPLICATION NO. | : 13/709197 | |
| DATED | : August 11, 2015 | |
| INVENTOR(S) | : Friedrichsen et al. | |

It is certified that error appears in the above-identified patent and that said Letters Patent is hereby corrected as shown below:

In the Claims:

Claim 1, Column 16, Lines 46-47, delete "internals; configured" and insert -- internals configured --.

Signed and Sealed this
Fifteenth Day of March, 2016

Michelle K. Lee
*Director of the United States Patent and Trademark Office*